United States Patent [19]
Emerson

[11] 3,774,439
[45] Nov. 27, 1973

[54] APPARATUS FOR ASSESSING THE DAMPING PERFORMANCE OF VEHICLE SUSPENSION SYSTEMS

[75] Inventor: Reginald Stanley Emerson, Buckingham, England

[73] Assignee: Leslie Hartridge Limited, Buckingham, England

[22] Filed: July 9, 1971

[21] Appl. No.: 161,020

[30] Foreign Application Priority Data
July 10, 1970 Great Britain.................. 33,706/70

[52] U.S. Cl. .................................................. 73/11
[51] Int. Cl. .......................................... G01m 17/04
[58] Field of Search............................... 73/11, 117; 33/203.12, 203.13

[56] References Cited
UNITED STATES PATENTS
| | | | |
|---|---|---|---|
| 3,164,003 | 1/1965 | MacMillan............................... | 73/11 |
| 3,187,554 | 6/1965 | Lackman ................................. | 73/11 |
| 3,313,142 | 4/1967 | Lackman ................................. | 73/11 |
| 3,383,909 | 5/1968 | Percy..................................... | 73/11 X |
| 3,456,489 | 7/1969 | Levenson................................ | 73/11 |
| 2,934,940 | 5/1960 | Beissbarth.............................. | 73/11 |
| 2,799,158 | 7/1957 | Federspiel........................... | 73/11 X |

FOREIGN PATENTS OR APPLICATIONS
692,989   8/1964   Canada................................... 73/11

*Primary Examiner*—Richard C. Queisser
*Assistant Examiner*—John P. Beauchamp
*Attorney*—Berman, Davidson & Berman

[57] ABSTRACT

Apparatus for assessing the damping performance of a vehicle suspension system, comprising vehicle suspension-displacing means for bringing about an initial disturbing displacement of at least part of a vehicle suspension system, and indicating and/or recording means arranged to detect and aggregate all the resultant reciprocating movements of the vehicle body until those movements cease and to indicate and/or record the aggregated amount of movement.

6 Claims, 11 Drawing Figures

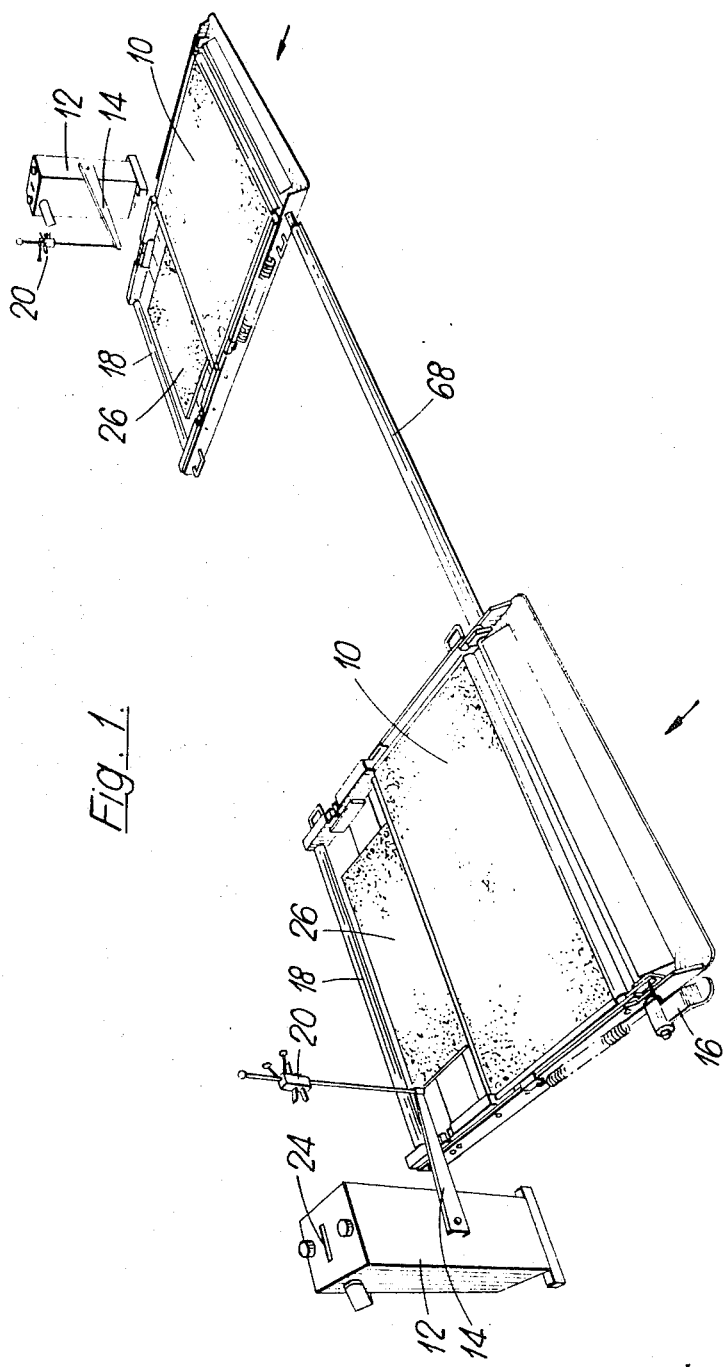

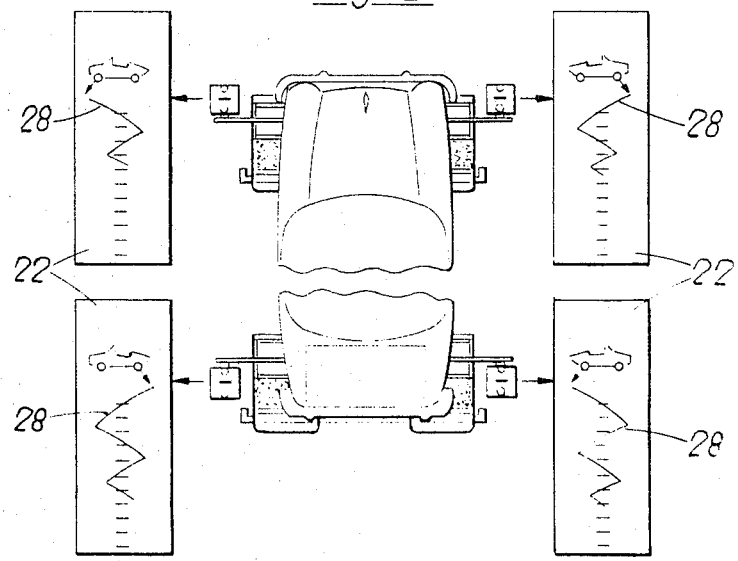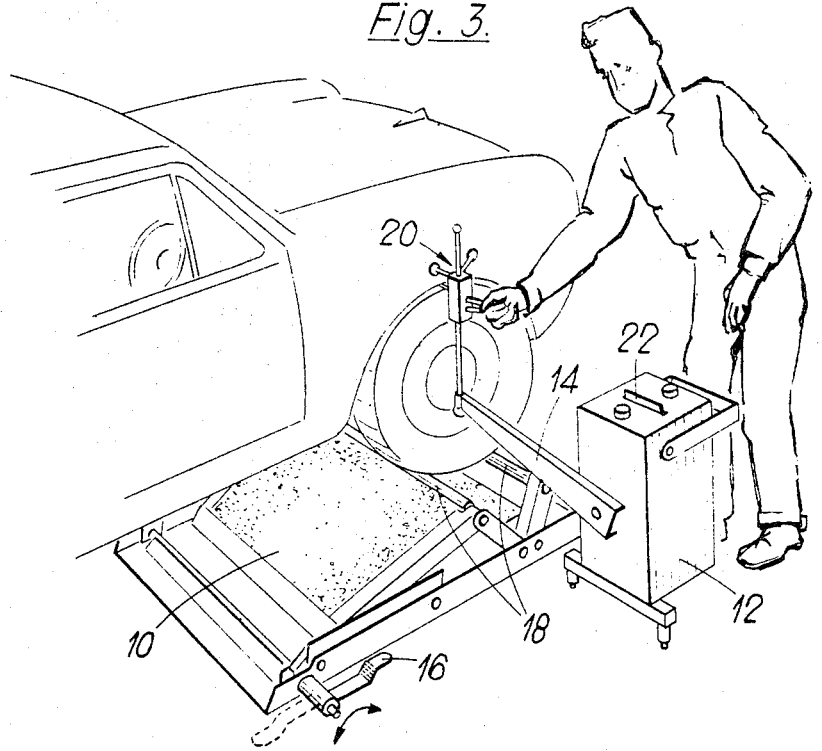

Inventor
REGINALD STANLEY EMERSON,

By
Berman, Davidson & Berman, Attorneys

APPARATUS FOR ASSESSING THE DAMPING PERFORMANCE OF VEHICLE SUSPENSION SYSTEMS

This invention relates to apparatus for assessing the damping performance of vehicle suspension systems and is especially concerned with the problem of ascertaining whether the shock absorbers in a vehicle suspension system are providing the damping performance which they are designed to give. The invention has been devised with the needs of vehicle garages and service stations particularly in mind, but it can equally well be used in the final inspection areas of vehicle-producing factories.

The main aim in the design of the apparatus with which the present invention is concerned with has the need to produce testing equipment which is able to give a numerical value to the damping performance of a shock absorber installed on a vehicle, and according to the invention apparatus for assessing the damping performance of a vehicle suspension system comprises vehicle suspension-displacing means for bringing about an initial disturbing displacement of at least part of a vehicle suspension system, and indicating and/or recording means arranged to detect and aggregate all the resultant reciprocating movements of the vehicle body until those movements cease and to indicate and/or record the aggregated amount of movement.

The suspension-displacing means can comprise a ramp or platfrom onto which one or more wheels of a vehicle are driven and then dropped by the operation of a release member which causes the ramp or platfrom to collapse, while the indicating and/or recording means can be arranged to produce a visual record on a card of the reciprocating movements of a wheel arch or some other part of the vehicle body adjacent the said wheel or wheels after the latter have been dropped. The total amount of up-and-down motion of the said vehicle part after the wheel or wheels on the ramp or platfrom have come to rest following the collapse of the latter is an indication of the damping performance of the vehicle suspension system and the shock-absorber or absorbers being tested. The unit of damping performance can accordingly be defined as a unit for measuring the total amount of up-and-down motion of the vehicle body which takes place after the wheel or wheels on the ramp or platfrom have been dropped. A low number of damping performance units indicates a high order of damping of the said up-and-down motion, this being a feature of so-called "hard" suspension systems. Similarly, a higher number of damping performance units indicates a lower order of damping of the said motion, this being a feature of "soft" suspension systems.

In the preferred form of the invention, the indicating and/or recording means are in the form of an instrument arranged to stand freely on the floor of the testing area and having a lever adapted to be releasably attached to the wheel arch or other suitable part of the vehicle to be tested. The lever operates a card feed mechanism within the instrument which moves the card along one axis and in the same direction whether the lever rises or falls. The lever also operates a stylus which moves backwards and forwards transversely to the said axis as the lever rises and falls. This causes the stylus to trace the above mentioned up-and-down motion of the vehicle body on a card or sheet of paper in the form of a zig-zag line. The card or sheet of paper is thus moved along one axis by the reciprocating movements of the vehicle body and by an amount proportional to the sum total of those movements in both directions. The transverse stylus movement indicates the amplitude of vehicle movement at each reversal, and it also indicates the total card movement in the other axis.

Since the card moves only in one direction, it can be marked off in units of damping performance so that the reading given by the graph is immediately apparent.

An example of apparatus in accordance with the invention is shown in the accompanying drawings, in which:

FIG. 1 is a perspective view of the apparatus;

FIG. 2 is a plan view of a vehicle undergoing test on the apparatus to illustrate the positioning of the recorders during the testing procedure and to illustrate the results obtained on test cards;

FIG. 3 is a perspective view of part of the apparatus with a vehicle in the raised position and with a recorder connected to the vehicle;

The apparatus shown in FIG. 1 comprises a pair of ramps 10 onto which a pair of vehicle wheels can be driven, and a pair of recorders 12 which have levers 14 for attachment to the wheel-arches of the vehicle being tested. The ramps 10 are of collapsible construction so as to serve as vehicle suspension-displacing means for bringing about an initial disturbing displacement of at least part of a vehicle suspension system. The recorders 12, by reason of their levers 14 being attached to the wheel-arches, are arranged to detect and aggregate the resultant reciprocating movements of the vehicle body until those movements cease. They are also arranged to record the aggregated amount of movement on a card or sheet of paper.

Figure 10:
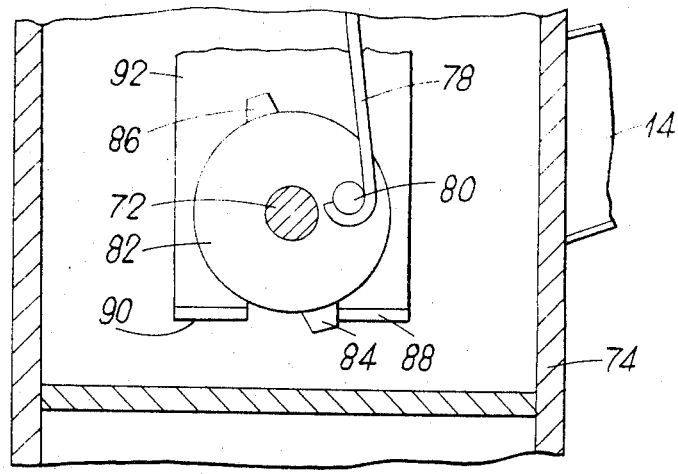
FIG. 10 is a section taken on the line X — X in FIG. 9.

The two ramps 10 are provided wuth operating pedals 16. With the pedals in the position shown in FIG. 1, the apparatus will not operate when a vehicle is driven onto the ramps. In use, the operating pedals are moved into their opposite position shown in FIGS. 5 and 6 when the vehicle, on touching the ramps, will cause the wheel-support bars 18 to lift (see FIG. 6) so that the ramps guide the wheels onto the support bars where the vehicle is halted. Connecting brackets 20 on the levers 14 are then attached to the underside of the wheel arches (see FIG. 3), and record cards 22 (see FIGS. 4 and 10) are inserted into slots 24 in the recorders and engaged with the mechanism in each recorder.

Figure 4:
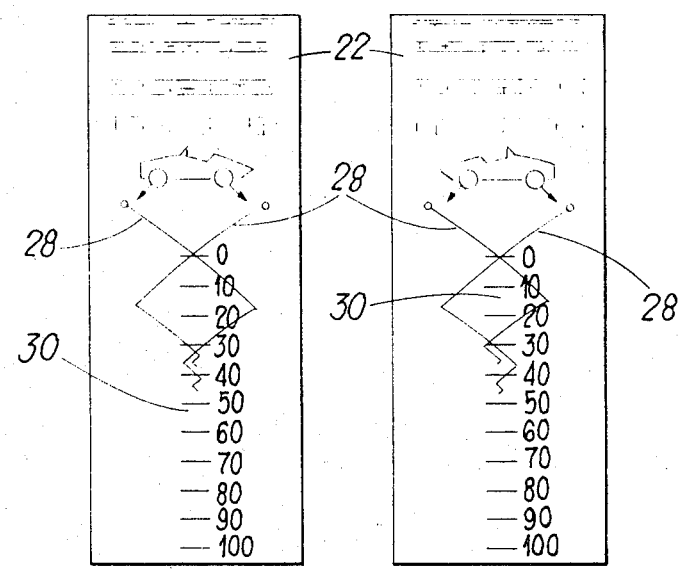
FIG. 4 illustrates the results of tests on all four wheels of a vehicle, the results being recorded on two record cards.
Figure 6:
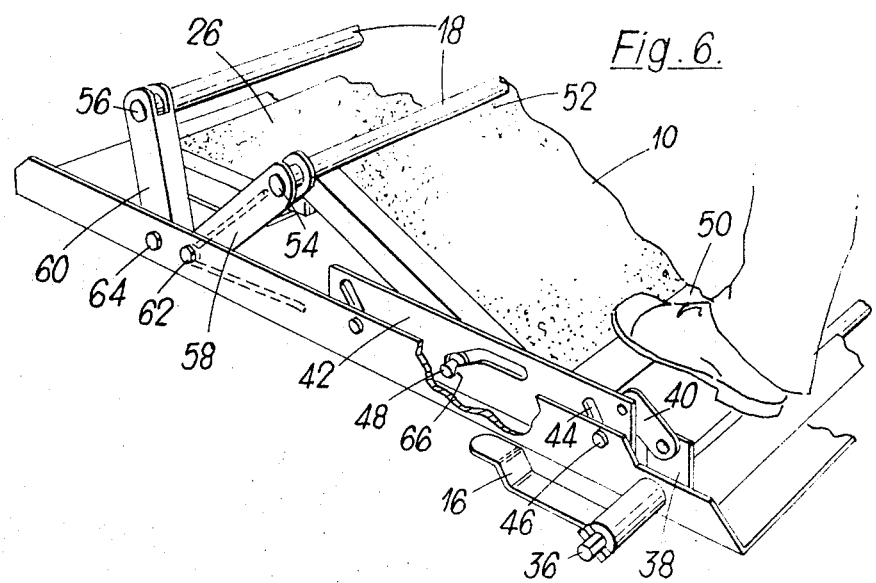
Figure 7:
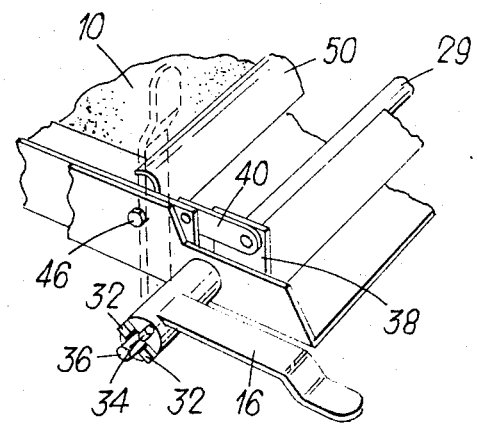
Figure 8:
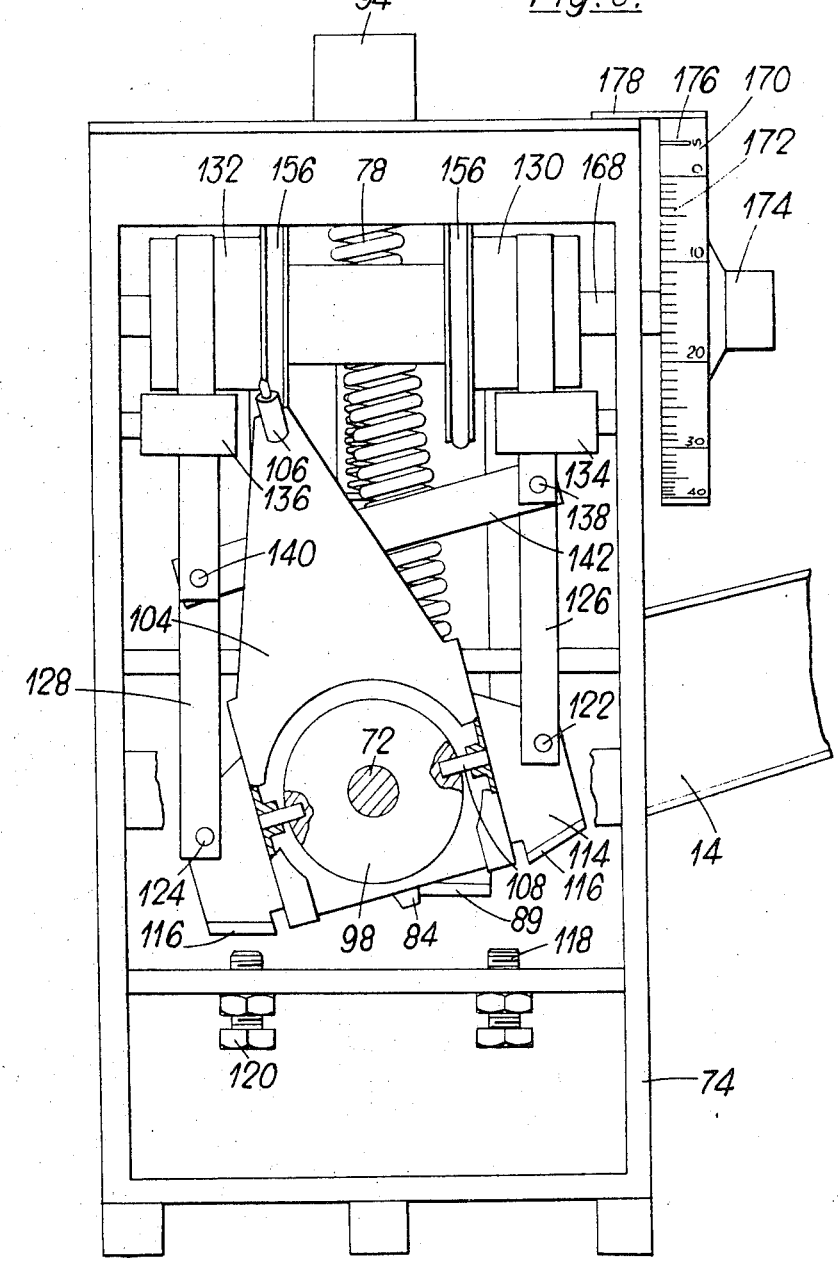
FIG. 8 is a rear view of one of the recorders with the back cover and certain other parts removed for the sake of clarity.
Figure 9:
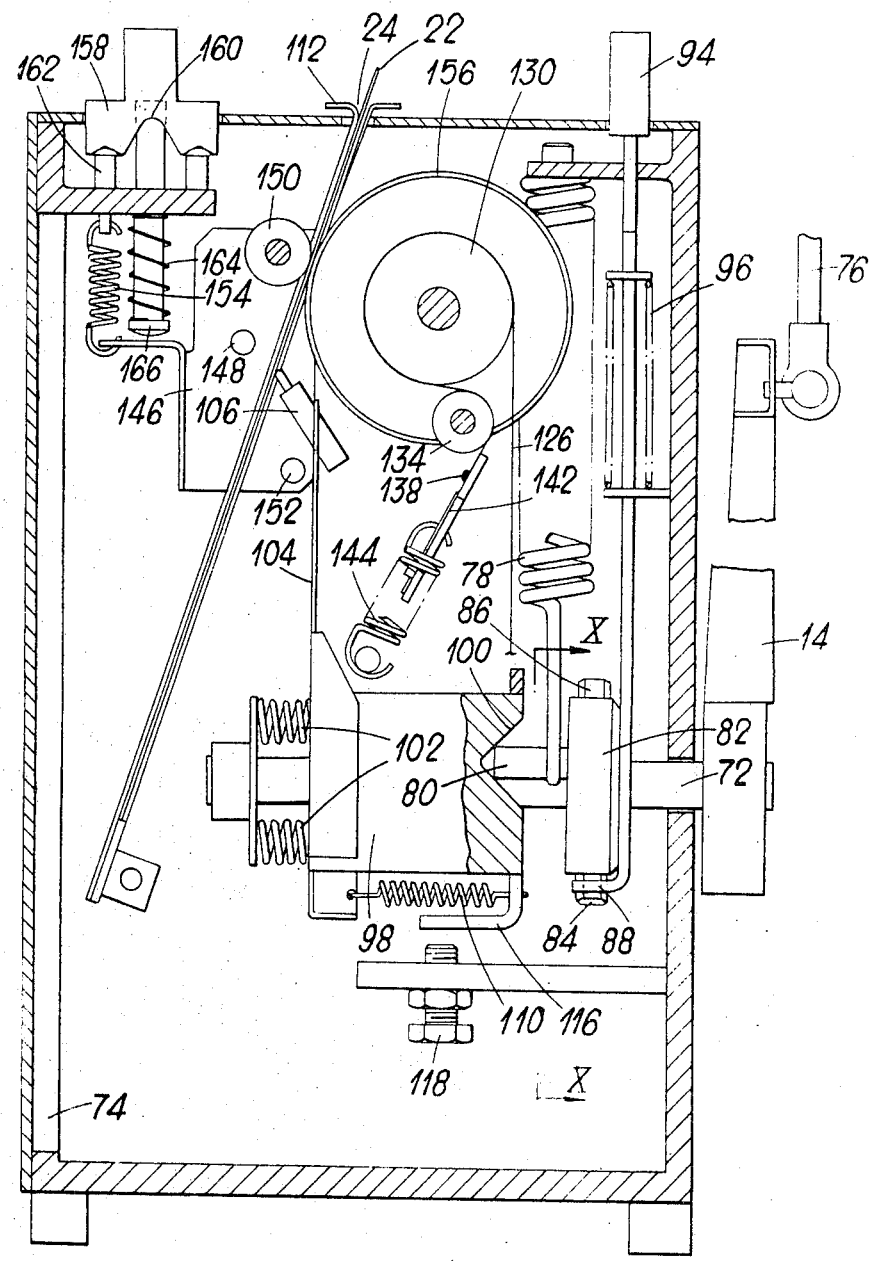
FIG. 9 is a verticle section through the recorder shown in FIG. 8.

If now the operating pedals 16 are reversed to the positions shown in FIGS. 1 and 7, the wheel-support bars 18 will collapse. The wheels thus drop onto the compliance pads 26 (see FIGS. 6 and 8), and the recorders 12 record the subsequent vehicle body movements. The record cards 22 emerge from the slots 24 and are removed from the recorders. The operation is then repeated for the rear wheels of the vehicle using the same cards 22 but turning the recorders 12 round the other way. FIG. 2 shows the positions and attitude of the recorders 12 with respect to the front and rear wheels of the vehicle. This figure also shows that turning round the recorders reverses the graphs 28 produced so that the two graphs on each card can be identified with the appropriate vehicle wheel. In practice, the two graphs 28 on each card will be superimposed on each other as shown in FIG. 4. The two cards illustrated therein also show how the graphs relate to the scale 30 of damping performance figures.

Figure 5:
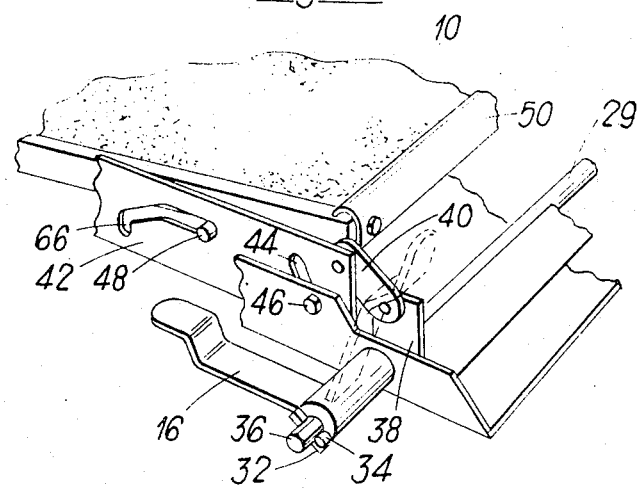
FIGS. 5, 6 and 7 are enlarged perspective views illustrating the pedal action on one of the ramps which raise and drop the vehicle wheels.

FIG. 5 illustrates in detail the operation of the operating pedal 16. When it is moved to the position shown therein, dogs 32 engage a pin 34 and turn a shaft 36 which carries levers 38 on its hexagonal profile. The levers 38, by means of links 40, push against a bar 42 with its inclined slots 44 engaging studs 46. The bar 42 therefore moves forwards and rises, taking with it a pin 48 which passes right through the ramp 10. The toe 50 of the ramp therefore rises substantially vertically.

As can be seen from FIG. 6, downward pressure on the toe 50 will cause the opposite end 52 of the ramp 10 to rise along with the bars 18 which pass through holes 54, 56 in levers 58, 60 which mesh together at their pivot points 62, 64 so that they both rise or fall in unison. The lever 60 therefore rises at the same time as the lever 58, bringing with it the other support bar 18. By this time, the pin 48 will have dropped into a slot 66 in the bar 42. At the same time, the lever 38 and the link 40 will be just over centre so that any amount of weight on the wheel-support bars 18 will not tend to turn the shaft 36. It is in this position of these various components that the two ramps 10 support two of the vehicle wheels.

To drop the vehicle wheels, the pedal 16 is brought to the position shown in FIG. 7. The dogs 32 now contact the pin 34 and turn the shaft 36 in the opposite direction so that the lever 38 and the link 40 are no longer over centre. The weight of the vehicle therefore pushes the bar 42 backwards and downwards. This causes the toe 50 of the ramp 10 to touch the baseplate of the ramp, and the pin 48 is raised out of the slot 66. The whole mechanism therefore reverts to the position shown in FIG. 7. FIG. 1 also shows that a synchronising tube 68 connects the two ramps together so that they both drop simultaneously however slowly the operating pedal is moved. In addition, it will be noted from FIG. 6 that the levers 58 of the ramps 10 are provided with internally-located springs 70 to balance, partially or wholly, the weight of the ramp mechanism.

FIGS. 8-11 illustrate, in detail, the construction of the two recorders 12 and the attachment bracket 20 by which their levers 14 are attached to the wheel arches of the vehicle under test. As will be seen from FIGS. 8 and 9, each recorder has a spindle 72 mounted in a housing 74, the spindle carrying the lever 14 which, at its outer extremity, carries a push rod 76 and the attachment bracket 20 (see FIG. 11). The lever 14 is biased in an upward direction by a spring 78 connected at its upper end to the housing 74 and having a tail at its lower end hooked around a pin 80 which, in turn, is carried in a boss 82 rigidly mounted on the spindle 72.

The boss 82 carries stops 84 and 86, and with the lever 14 in the position shown the stop 84 bears against a pawl 88. The pawl 88 and another pawl 90 are carried on a slideable plate 92 surmounted by a push button 94 and biased in an upward direction by a spring 96. The lever 14, on being pushed downwards against the spring 78, can therefore move over a limited arc bounded by the contact of the stop 84 against the pawls 88 and 90. As it moves, a boss 98 is carried with it by contact of the conically-ended pin 80 in a V-groove 100 in the boss 98 under the biasing action of several springs 102. A lever 104 carries at its upper end a stylus point 106 and is mounted on a pivot 108, the lever being biased by a spring 110 so that the stylus point makes contact with a card 22 inserted in a magazine 112 provided with a suitable window to expose the card to the stylus. Movement of the lever 14 within its permitted arc therefore causes the stylus 106 to move transversely across the card 22. The card 22 is preferably made of a commercially-available material which changes colour on contact with a metal stylus, but a ball-point pen would serve the purpose equally well on plain card.

The boss 98 also carries a transverse lever 114 having two stop pads 116. Screw stops 118 and 120 are adjusted so that they nearly make contact with the stop pads 116 at the extremes of movement of the lever 14 within its permitted arc. The transverse lever 114 also carries two pins 122 and 124 forming anchorage points for one end of each of two steel tapes 126 and 128. These tapes pass over rollers 130 and 132 respectively and thence over rollers 134 and 136 respectively, finally terminating at pins 138 and 140 on a cantilever 142. The cantilever 142 is biased to tension the tapes by means of a spring 144.

A cradle 146 which is free to swivel on a pivot 148 carries a roller 150 and a transverse pin 152. It is biased by a spring 154 so that the roller 150 traps the card 22 between itself and rubber-tyred rollers 156. A control knob 158 having a cam form 160 biased towards pins 162 by a spring 164 contacts, at its lower end 166, a platform on the cradle 146. The spring 164 is stronger than the spring 154 so that, on turning the knob 158, the contact 164 tips the cradle 146 so as to swing the roller 150 away from the rollers 156 and, at the same time, to swing the rod 152 into contact with the stylus lever 104 so as to bring the stylus out of contact with the card 22.

Depression of the button 94 slides the plate 92 downwards and disengages the pawl 88 from the stop 84. The lever 14 can now be lifted upwards until vertical and then be pushed downwards on the opposite side so that the stop 86 contacts the upper side of the pawl 90. This depresses the slide 92 until the stop 86 is clear of the pawl 90, when the spring 96 raises the slide 92 once more so that the stop 86 takes up a positio between the two pawls 88 and 90. The pin 80 will now be on the opposite side so that the spring 78 acts in the opposite direction with respect to the spindle 72 and biases the lever 14 in an upward direction so that the stop 86 contacts the pawl 90. The lever 14 still has the same permitted movement as before but on the opposite side of the casing 74. As soon as the button 94 is depressed so as to free the pawl 88 from engaging the stop 84 and the lever 14 commences to move upwardly, the stop pad 116 contacts the screw stop 120 so as to prevent further movement of the lever 114. the pin 80 then interacts with the V-groove 100 so as to slide the boss 98 along the spindle 72 in opposition to the spring 102. As the lever 14 passes through the vertical position and moves downwards on the other side of the casing, the pin 80 enters the opposite side of the groove 100 and once more locates the stylus lever 104 with respect to the lever 14. When the lever 14 has been depressed sufficiently far to bring the stop 86 into contact with the pawl 90 under the biasing action of the spring 78, the stylus lever 104 will take up a position symmetrically opposite to that shown in FIG. 8 because the relative angle between the stylus lever 104 and the lever 14 is the same whichever side the pin 80 engages the slot 100.

The spindle 168 of the rollers 130,132 passes through the wall of the casing 74 and has mounted on its extremity a circular drum 170 provided with a scale of numbers 172 on its outer periphery. The drum 170 is free to rotate on the spindle 168 but is restrained by friction means 174 so that the drum can be turned manually on the spindle 168 in such a way that a mark 176 on the scale can be brought into alignment with a pointer 178. But, on oscillating the lever 14, the drum 170 will rotate so as to produce a reading on the scale against the pointer 178.

Figure 11:
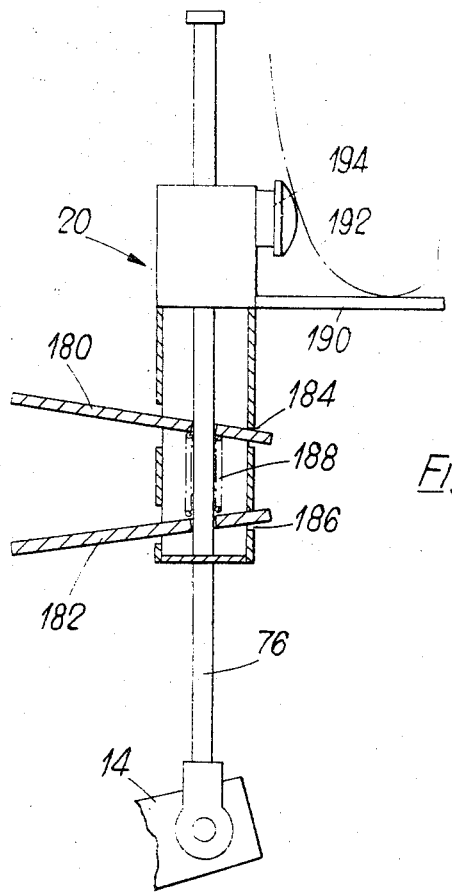
FIG. 11 is a vertical section through an attachment bracket forming part of the recorder.

Referring now to FIG. 11, the attachment bracket 20 is free to slide on the rod 76. Two sprags 180 and 182 are biased against abutments 184 and 186 respectively by a spring 188. The sprag 180 therefore prevents downward movement of the bracket 20 on the rod 76, while the sprag 182 prevents upward movement. If the sprags 180 and 182 are squeezed together, then they are both freed and the bracket 20 can move freely on the rod 76. With the lever 14 at the upward extremity of its free arc of movement under the biasing action of the spring 78, the bracket 20 can therefore be slid up the push rod 76 until a pad 190 contacts the underside of a suitable part of the body 192 of the vehicle when the sprags 180 and 182 can be released so as to lock the bracket 20 onto the rod 76, leaving the lever 14 in its said position of rest. A suitable soft buffer 194 prevents contact of the rod 76 with the vertical side of the vehicle bodywork 192.

The apparatus described above is used in the following manner:

Position the two recorders 12 as shown in FIG. 1, and move the operating pedal 16 to the cock position shown in FIG. 3. Drive the vehicle in the direction of the arrows towards the ramps 10. On contact of the wheels with the ramps, the support bars 18 will rise and lock in position because the pin 48 has dropped into the slot 66 (see FIG. 6) and the lever 38 and the link 40 have passed over centre. Drive the vehicle forwards until the front wheels are cradled between the two support bars 18 on either side. Take hold of the sprags 180 and 182 of one bracket 20 (see FIG. 11) and lift the bracket until the pad 190 rests under the wheel arch of the front wheels of the vehicle. Without biasing the lever 14 downwards, release the sprags so that pad 190 remains in contact with the wheel arch of the vehicle. Repeat this operation with the other record 12. Insert a record card 22 into the magazine of each recorder, and turn the knobs 158 so as to trap the record cards between the rollers 150 and 156 and also to permit each stylus 106 to come into contact with the corresponding record card. Now reverse the position of the operating pedal 16 to the drop position shown in FIG. 1. All four support bars 18 will now drop simultaneously and the front wheels of the vehicle will drop onto the compliance pads.

The body of the vehicle will now reciprocate downwardly and upwardly until coming to rest. The lever 14 of each recorder will follow this motion and cause the rollers 156 to rotate so as to raise the cards out of the recorders. At the same time, each stylus 106 will oscillate, with the result that a zig-zag line is drawn on the record card. When the vehicle comes to rest, release the cards 22 from the rollers 156 and the stylus from the cards by returning the knobs 158 to their original positions. Push the cards 22 back into the bottom of the magazine 112, release the attachment brackets 20 from the vehicle body, depress the knobs 94, and bring each lever 14 to a vertical position.

Return the operating pedal 16 to the cock position shown in FIG. 3 and drive the vehicle forwards until the rear wheels raise the support bars 18 once more and come to rest between the bars. Turn the recorder housings 74 round to the positions shown in the lower half of FIG. 2. Push the levers 14 downwards towards the car until the pawls 88 and 90 engage the stops 84 and 86. Re-attach the brackets 20 to the vehicle body under the rear wheel wing arches. Turn the knobs 158 once more to re-engage the cards 22 and reverse the operating pedal 16 to the drop position. The support bars 18 will once more collapse and the rear wheels will drop onto the compliance pads 26. Once more each stylus 106 will draw a zig-zag line on its record card, but in this instance the lines will commence from the opposite sides of the record cards.

FIG. 4 shows an example of the four diagrams which will have been drawn on the two record cards 22. An image of a vehicle on the cards shows the relationship of each of the four diagrams to the vehicle wheels. The diagrams extend downwards and, in this instance, come to rest at different points on the scale 30. The reading on this scale at which the diagrams terminate indicates the damping performance of the four individual suspension units or shock absorbers of the vehicle. The scale printed on the record cards is such that the graph commences at a predetermined point indicated by a small circle. It is also arranged so that, after the wheels of the vehicle have dropped and the vehicle body is falling, when the body reaches the position at which it will finally come to rest the graph will have reached zero on the scale. The geometry of the parts within each recorder housing 74 is such that the movement of the record card as it is driven by the roller 156 bears a definite mathematical relationship to the movement of the body of the vehicle. Since the record card moves in the same direction irrespective of whether the vehicle boby rises or falls, the total movement (that is the reading on the scale) indicates the aggregate displacement of the vehicle body minus the initial drop. The aggregate body displacement bears a positive relationship to the overall damping effect of the suspension of the vehicle. Accordingly, the reading obtained on the card also bears a similar relationship to the damping effect of the vehicle suspension.

If a printed read-out is not required then, before dropping the vehicle, the circular scale 172 can be set so that the start position 176 lines up with the pointer 178. On dropping the vehicle wheels, the scale 172 will then produce a similar reading to that obtained on the record card. When testing in this manner, it is not necessary to turn each recorder 12 round when changing from the front axle to the rear axle of the vehicle.

I claim:

1. Apparatus for assessing the damping performance of a vehicle suspension system, said apparatus comprising a collapsible wheel-support onto which at least one wheel of a vehicle to be tested is driven, said wheel-support including a ramp over which the vehicle wheel runs as the wheel is positioned on the support, the ramp being pivotally mounted at an intermediate point with the pivotal axis at right angles to the direction of movement of the vehicle so that the weight of the vehicle, as the said wheel first contacts the ramp, causes the ramp to tip and bring the wheel-support into a raised position, releasable means for holding the wheel-support in the said raised position with the vehicle wheel supported thereon, control means for releasing said releasable means whereby the wheel-support collapses and drops downwards from the said raised position, the vehicle wheel supported on the wheel-support thereby being dropped a predetermined distance under the action of gravity augmented by springs of the vehicle suspension, indicating means to detect the total amount of up-and-down motion of a selected part of the vehicle adjacent the said vehicle wheel after the vehicle wheel has come to rest following the collapse of the wheel-support, recording means forming part of said indicating means to produce a permanent record on removable sheet material of such up-and-down motion, and movement-transmission means adapted to be attached to the said selected part of the vehicle adjacent the said vehicle wheel and to transmit movement of that vehicle part after collapse of the wheel-support to the said indicating means.

2. Apparatus according to claim 1, in which said movement-transmission means comprise a projecting lever provided at one end with a bracket which is adapted to be attached to a part of the bodywork of the vehicle so that reciprocating movements of the vehicle body are transmitted to the lever, the said indicating means comprising a cylindrical roller free to rotate about its axis and having two spaced-apart, flexible but inextensible, bands wrapped around its circumference, one end of each band being attached to tensioning means and the other end being connected to the extremities of a rocking lever attached at its mid point to the pivot of said projecting lever so that, irrespective of whether the latter rises or falls in sympathy with reciprocating movements of the vehicle body, the roller is caused to rotate due to greater friction of the particular band being pulled by the rocking lever in one direction.

3. Apparatus according to claim 2, in which the cylindrical roller is provided at one end with indicating means comprising a scale and a pointer having relative movement therebetween so as to indicate the amount of rotation of the cylindrical roller as the projecting lever follows the movements of the vehicle body.

4. Apparatus according to claim 2, in which the cylindrical roller is arranged to drive record sheet material in a tangential direction as the roller turns, there being a further lever associated with the rocking lever and carrying a stylus adapted to mark the record sheet material so that, with the roller driving the record sheet material always in the same direction, the stylus traverses from side to side at right angles to the direction of movement of the record sheet material and produces a zig-zag graph thereon.

5. Apparatus according to claim 2, in which the rocking lever is connected to the pivot spindle of the projecting lever by means adapted to lock the rocking lever to the projecting lever in either of two angular relationships so that, with respect to the rocking lever, the projecting lever can be set in a substantially horizontal attitude to either side of its pivot.

6. Apparatus according to claim 4, in which the record sheet material comprises a rectangular card arranged to be driven by the cylindrical roller and provided with a scale the axis of which is parallel to the direction of movement so that, when the card is positioned within the indicating means and the projecting lever is biased upwards to a stop abutment, the scale bears a finite relationship to the stylus in such a manner that the reading on the scale at which the zig-zag graph terminates bears a mathematical relationship to the aggregated movement of the vehicle body.

* * * * *